United States Patent
Huang et al.

(10) Patent No.: US 12,401,055 B1
(45) Date of Patent: Aug. 26, 2025

(54) DETECTION SYSTEM AND DETECTION METHOD FOR DETECTING TAB BACK OF BARE BATTERY CELL IN CELL COMBINING APPARATUS

(71) Applicant: CONTEMPORARY AMPEREX TECHNOLOGY CO., LIMITED, Ningde (CN)

(72) Inventors: Wenfang Huang, Ningde (CN); Deming Xu, Ningde (CN); Pengfei Meng, Ningde (CN); Wuqiong Zhang, Ningde (CN); Nishan Zheng, Ningde (CN); Shumao Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/207,395

(22) Filed: May 14, 2025

Related U.S. Application Data

(63) Continuation of application No. PCT/CN2024/113193, filed on Aug. 19, 2024.

(30) Foreign Application Priority Data

Feb. 2, 2024 (CN) .......................... 202410146273.0

(51) Int. Cl.
H01M 10/04 (2006.01)
(52) U.S. Cl.
CPC ................ H01M 10/0404 (2013.01)
(58) Field of Classification Search
CPC ............ H01M 10/0404; H01M 10/14; H01M 10/0413; H01M 10/281; H01M 10/287;
(Continued)

(56) References Cited

U.S. PATENT DOCUMENTS

| 2021/0013481 A1* | 1/2021 | Kuwata | H01M 50/244 |
| 2021/0296679 A1* | 9/2021 | Chung | H01M 10/0404 |

(Continued)

FOREIGN PATENT DOCUMENTS

| CN | 207907826 U | 9/2018 |
| CN | 109269420 A | 1/2019 |

(Continued)

OTHER PUBLICATIONS

International Search Report and Written Opinion of PCT Application No. PCT/CN2024/113193, mailed Nov. 29, 2024, 7 pages with English translation.

(Continued)

*Primary Examiner* — Helen K Conley
*Assistant Examiner* — Amanda Rosenbaum
(74) *Attorney, Agent, or Firm* — K&L Gates LLP

(57) ABSTRACT

A detection system and method for detecting a tab back of a bare battery cell during a cell combining operation are disclosed. The system includes a top cap carrying apparatus, a cell combining apparatus, a first detection apparatus, a second detection apparatus, and a control apparatus. The cell combining apparatus displaces two bare battery cells from a lying state to an upright cell combining state when a top cap is supported. The top cap carrying apparatus moves from a carrying position to a displacement position, enabling the tabs to extend and expose an anode tab back part and a cathode tab back part. The first and second detection apparatuses capture images of the respective tab back parts. The acquired images are processed for use in subsequent operations. This system enables real-time image acquisition of the tab back parts during the combining process, providing comprehensive quality information for the bare battery cell tabs.

20 Claims, 6 Drawing Sheets

(58) Field of Classification Search
CPC .. H01M 10/0472; G01N 23/18; G01N 23/083
See application file for complete search history.

(56) References Cited

U.S. PATENT DOCUMENTS

| | | | |
|---|---|---|---|
| 2023/0035506 A1 | 2/2023 | Rogojina et al. | |
| 2023/0251212 A1* | 8/2023 | Wagner | G01N 23/18 382/141 |
| 2023/0318155 A1* | 10/2023 | Chen | H01M 50/566 429/179 |
| 2023/0368367 A1* | 11/2023 | Zeng | H01M 10/4285 |

FOREIGN PATENT DOCUMENTS

| | | |
|---|---|---|
| CN | 209626353 U | 11/2019 |
| CN | 113376177 A | 9/2021 |
| CN | 115656197 A | 1/2023 |
| CN | 218274722 U | 1/2023 |
| CN | 115839959 A | 3/2023 |
| CN | 219065316 U | 5/2023 |
| CN | 117214299 A | 12/2023 |
| CN | 117686517 A | 3/2024 |
| EP | 4297113 A1 | 12/2023 |
| WO | 2023160176 A1 | 8/2023 |
| WO | 2024011984 A1 | 1/2024 |
| WO | 2024088020 A1 | 5/2024 |
| WO | 2024093643 A1 | 5/2024 |

OTHER PUBLICATIONS

Grant Notice received in the counterpart CN application 202410146273.0, mailed on Mar. 15, 2024, 7 pages with English translation.

Doorsamy, Wesley, An Experimental Design for Static Eccentricity Detection in Synchronous Machines Using a Cramer-Rao Lower Bound Technique, IEEE Transactions on Energy Conversion, vol. 30, No. 1, Mar. 31, 2015, pp. 254-261.

Wu, Chaoyue et al., Battery Tab Welding Dimension Accuracy Inspection, Technology Innovation and Application, vol. 2, Jan. 15, 2014, pp. 24-27 and 31.

* cited by examiner

DETECTION SYSTEM AND DETECTION METHOD FOR DETECTING TAB BACK OF BARE BATTERY CELL IN CELL COMBINING APPARATUS

CROSS-REFERENCE TO RELATED APPLICATIONS

The present application is a continuation of PCT Application No. PCT/CN2024/113193, filed Aug. 19, 2024, which claims priority to Chinese Patent Application No. 202410146273.0, entitled "DETECTION SYSTEM AND DETECTION METHOD FOR DETECTING TAB BACK OF BARE BATTERY CELL IN CELL COMBINING APPARATUS" and filed on Feb. 2, 2024, which is incorporated herein by reference in its entirety.

TECHNICAL FIELD

The present disclosure relates to a detection system and a detection method for detecting a tab back of a bare battery cell in a cell combining apparatus.

BACKGROUND

A cell combining operation exists in an assembly process of a bare battery cell. To be specific, two bare battery cells are switched from a lying state to an upright cell combining state with tabs facing downward. During cell combining, a body of the bare battery cell needs to be "lifted up" by 90 degrees relative to a welded top cap. Consequently, a surface layer of a tab between the body of the bare battery cell and the top cap is prone to breakage due to a bending force. Especially, a back part of the tab facing outward is prone to cracking. Therefore, a cracking status of the tab back needs to be detected online when the cell combining operation is completed, so as to obtain information about quality of the tab back for use in a subsequent process.

SUMMARY

In view of the foregoing problems existing in the related art, embodiments of the present disclosure are intended to provide a detection system and a detection method, so as to perform online detection on an anode (cathode) tab back part of a bare battery cell during a cell combining operation, thereby detecting whether a defect exists in the tab back part of the bare battery cell, for use in a subsequent process.

In one aspect, the present disclosure provides a detection system for detecting a tab back of a bare battery cell in a cell combining apparatus. The detection system includes a top cap carrying apparatus, a cell combining apparatus, a first detection apparatus, a second detection apparatus, and a control apparatus. The top cap carrying apparatus is configured to be movable at least between a carrying position that supports a top cap of a bare battery cell and a displacement position that exactly abuts against but no longer supports the top cap. The top cap of the bare battery cell is welded together with an anode tab and a cathode tab. The cell combining apparatus is configured to displace bodies of two bare battery cells disposed in parallel from a lying state to an upright cell combining state in a case that the top cap is supported by the top cap carrying apparatus. In the upright cell combining state, the body of the bare battery cell is completely held by a holding apparatus and a tab back faces outward. The top cap carrying apparatus is configured to move, under a drive of a first drive mechanism, from the carrying position to the displacement position after the bare battery cell is in the upright cell combining state, to allow the anode tab and the cathode tab to extend to expose an anode tab back part and a cathode tab back part within a desired range. The first detection apparatus and the second detection apparatus each include an image acquisition mechanism. The first detection apparatus is configured to perform image acquisition on the anode tab back part laterally. The second detection apparatus is configured to perform image acquisition on the cathode tab back part laterally. The control apparatus is configured to control the cell combining apparatus to flip the body of the bare battery cell from the lying state to the upright cell combining state, control movement of the top cap carrying apparatus, control image acquisition by the first detection apparatus and the second detection apparatus, and receive and process acquired images, to determine whether defects exist in the anode tab back part and the cathode tab back part, for use in a subsequent process.

Therefore, the detection system of the present disclosure implements online detection on the anode tab back part and the cathode tab back part of the bare battery cell by using the mobility of the top cap carrying apparatus, thereby obtaining more comprehensive information of quality of the tab back.

According to one or more embodiments, the top cap carrying apparatus includes a support plate and a first drive mechanism. The support plate is configured to support the top cap of the bare battery cell, and the first drive mechanism is disposed on a platform. The first drive mechanism is connected to the support plate. The first drive mechanism is connected to the support plate, and is capable of driving the support plate to move in a direction from the bare battery cell to the platform, so that the anode tab and the cathode tab extend.

In the foregoing structure, the first drive mechanism can provide a drive force for movement of the support plate, and the support plate can transfer the drive force of the first drive mechanism to the top cap of the bare battery cell. By moving the support plate, the top cap of the bare battery cell can be controlled to move between the top cap carrying position and the displacement position, to adjust extension states of the anode tab and the cathode tab.

According to one or more embodiments, the first drive mechanism further includes a limiting fixture. The limiting fixture is disposed at an end of the support plate facing the bare battery cell. A surface of a side of the limiting fixture facing the bare battery cell is recessed to form an accommodating groove. A shape of the accommodating groove matches that of the top cap of the bare battery cell.

In the foregoing structure, the limiting fixture can guide a movement direction of the top cap of the bare battery cell, thereby reducing a risk that the top cap of the bare battery cell is deformed and displaced in a flipping process, improving detection accuracy, and improving structural integrity of the bare battery cell.

According to one or more embodiments, the first drive mechanism further includes a first drive motor and a limiting assembly. The limiting assembly includes a connection plate and two limiting plates. The connection plate is connected to the first drive motor, and the two limiting plates are connected to the connection plate. Surfaces of sides of the two limiting plates facing away from the first drive motor are recessed to form limiting grooves. The limiting grooves are configured to accommodate a part of the support plate to limit movement of the support plate relative to the connection plate.

In the foregoing structure, the connection plate is disposed to connect the two limiting plates to the first drive motor, and the limiting plates are provided with the limiting grooves to limit a position of the support plate, thereby reducing a risk that the support plate is displaced during movement, and improving stability in a detection process and accuracy of a detection result.

According to one or more embodiments, a pair of first detection apparatuses is disposed on opposite sides of the cell combining apparatus in alignment with each other, so as to respectively perform image acquisition on the anode tab back parts of the two bare battery cells disposed in parallel. A pair of second detection apparatuses is disposed on the opposite sides of the cell combining apparatus in alignment with each other, so as to respectively perform image acquisition on the cathode tab back parts of the two bare battery cells disposed in parallel.

Therefore, the detection system of the present disclosure can implement online detection on all the tab back parts of the two bare battery cells disposed in parallel, so as to respectively obtain high-quality images, thereby obtaining more comprehensive information of the quality of the tab back.

According to one or more embodiments, the first detection apparatus and the second detection apparatus each further include a light source. The light source includes a coaxial light source disposed coaxially with the image acquisition mechanism and a first strip-shaped light source and a second strip-shaped light source disposed on two sides of the coaxial light source. The control apparatus is capable of controlling to turn on the coaxial light source, to enable the image acquisition mechanism to acquire an image having a first exposure. Alternatively, the control apparatus is capable of controlling to turn on the coaxial light source, the first strip-shaped light source, and the second strip-shaped light source at the same time, to enable the image acquisition mechanism to acquire an image having a second exposure.

Therefore, the arrangement and illumination combination of the coaxial light source and the strip-shaped light sources may provide optional sufficient supplementary light for the image acquisition mechanism, so that the image acquisition mechanism may acquire high-quality images having a desired exposure according to an actual requirement.

According to one or more embodiments, the first detection apparatus further includes a mounting member disposed on the platform. The image acquisition mechanism includes an imaging apparatus and an imaging lens. The imaging apparatus and the imaging lens are disposed on the mounting member. The imaging lens is disposed between the imaging apparatus and the coaxial light source.

In the foregoing structure, the imaging apparatus is disposed to obtain images of the cathode tab back part and the anode tab back part, so as to implement image acquisition. The imaging lens is disposed to collect light from a photographed object, thereby improving an imaging effect of the imaging apparatus, and improving detection accuracy.

According to one or more embodiments, the cell combining apparatus includes a cell combining flipping mechanism and a second drive mechanism. The cell combining flipping mechanism is configured to be driven by the second drive mechanism to gradually flip and displace the body of the bare battery cell from the lying state to the upright cell combining state.

Therefore, the cell combining apparatus easily implements smooth and stable flipping of the bare battery cell.

According to one or more embodiments, the second drive mechanism includes a second drive motor, a fixed base, a rotation block, and a rotation bearing. The second drive motor and the fixed base are disposed on the platform, the rotation block is disposed on a side of the fixed base facing away from the second drive motor, and an output shaft of the second drive motor passes through the fixed base to be connected to the rotation block. The second drive motor drives the rotation block to rotate about the output shaft of the second drive motor, and the holding apparatus is connected to the rotation block. The rotation bearing is disposed between the rotation block and the fixed base, so as to connect the rotation block to the fixed base rotatably.

In the foregoing structure, the second drive motor is disposed to drive the rotation block to rotate, and the fixed base can support the output shaft of the second drive motor and the rotation block. The rotation block is configured to drive the holding apparatus to rotate, and the rotation bearing connects the rotation block to the fixed base rotatably, thereby reducing resistance and friction in a rotation process of the rotation block, improving stability in the rotation process to improve accuracy of detection, and reducing structural damage to the bare battery cell in the rotation process to maintain the structural integrity of the bare battery cell.

According to one or more embodiments, a quantity of the fixed bases is two, and two rotation blocks and two rotation bearings are correspondingly provided. The cell combining flipping mechanism further includes a transmission plate. The transmission plate is connected between the two rotation blocks. The holding apparatus is disposed on the transmission plate.

In the foregoing structure, the two fixed bases and the two rotation blocks are disposed to connect two ends of the transmission plate, thereby improving balance of force on the transmission plate and improving stability in the rotation process.

According to one or more embodiments, the cell combining apparatus further includes a third drive mechanism for driving the holding apparatus. The third drive mechanism is configured to drive the holding apparatus to gradually clamp the body of the bare battery cell in a flipping operation process, until the body of the bare battery cell is completely carried by the holding apparatus when the body of the bare battery cell is in the upright cell combining state.

Therefore, slow flipping of the battery cell and gradual increase of the clamping force reduce as much as possible damage to an anode (cathode) tab located between the body of the bare battery cell and the top cap, for example, crack caused by excessively fast bending of the anode (cathode) tab.

According to one or more embodiments, the holding apparatus includes a clamping portion disposed on the transmission plate. The clamping portion includes two clamping members disposed opposite to each other. A space between the two clamping members is configured for clamping the bare battery cell. According to the foregoing structure, the clamping member is disposed on the transmission plate. The clamping member can move with movement of the transmission plate, and clamp the bare battery cell for flipping. The two clamping members are disposed to clamp the bare battery cell from two sides, thereby improving a clamping force and stability in the flipping process.

According to one or more embodiments, the clamping member includes a clamping rod and a battery cell clamping block. One end of the clamping rod is connected to the transmission plate. The battery cell clamping block is disposed at the other end of the clamping rod. The battery cell clamping block is configured to clamp the bare battery cell and drive the bare battery cell to flip. A surface of the battery cell clamping block facing the bare battery cell is recessed to form a clamping groove. A shape of the clamping groove matches a shape of the surface of the bare battery cell.

In the foregoing structure, the clamping rod is disposed to apply a clamping force to the bare battery cell with movement of the transmission plate, and to transfer the clamping force to the bare battery cell by using the battery cell clamping block. The clamping groove is provided on the battery cell clamping block to reduce deformation caused by the clamping force on the surface of the bare battery cell, thereby protecting the surface of the bare battery cell, and improving structural integrity of a detected battery.

According to one or more embodiments, the third drive mechanism includes a third drive motor. The third drive motor is disposed on the transmission plate. The clamping rod is connected to the third drive motor. In the foregoing structure, the third drive motor is disposed to transfer a drive force to the clamping rod, thereby driving the clamping rod to move, and driving the clamping member to clamp the bare battery cell. The clamping force of the clamping member can be accurately adjusted by controlling the third drive motor, and the clamping force for the bare battery cell is increased as a flipping angle increases, to improve stability in the flipping process of the bare battery cell.

According to one or more embodiments, the holding apparatus further includes a drive connection plate. The drive connection plate is connected to the third drive motor. The clamping rod is disposed on the drive connection plate. There are two clamping portions, namely, an upper clamping portion and a lower clamping portion. The upper clamping portion and the lower clamping portion are spaced apart on the drive connection plate. In the foregoing structure, a plurality of clamping portions are disposed to add clamping points of the bare battery cell, thereby improving clamping stability, and also improving clamping stability for the battery cell in the flipping process.

According to one or more embodiments, a surface of a side of the transmission plate facing the drive connection plate is recessed to form a limiting slot. The limiting slot extends along an arrangement direction of the two clamping members. A surface of a side of the drive connection plate facing the limiting slot protrudes to form a limiting portion. The limiting portion is disposed in the limiting slot. The limiting slot is configured to limit movement of the drive connection plate relative to the transmission plate. In the foregoing structure, the limiting slot extends along the arrangement direction of the two clamping members, so that a movement direction of the drive connection plate can be limited to a direction towards the other clamping member or a direction away from the other clamping member, thereby reducing damage caused to an outer surface of the bare battery cell in a process of moving the clamping members. In addition, the limiting slot is provided, and the limiting portion is disposed in the limiting slot, so that a movement path of the limiting portion can be limited, thereby preventing damage to the bare battery cell caused by an excessively large movement range of the clamping member. The foregoing structure improves stability in the detection process, and enhances protection on the detected bare battery cell.

According to one or more embodiments, the holding apparatus further includes a cushion block. The cushion block is disposed on a side of the transmission plate facing the bare battery cell. In the foregoing structure, the cushion block is disposed to support a side surface of the bare battery cell, thereby improving stability in the flipping process.

In another aspect, the present disclosure provides a detection method. The detection method detects a tab back of a bare battery cell in a cell combining operation process of the bare battery cell by using a detection system. The detection system includes a top cap carrying apparatus, a cell combining apparatus, a first detection apparatus, a second detection apparatus, and a control apparatus. The top cap carrying apparatus is configured to be movable between a carrying position that supports a top cap of a bare battery cell and a displacement position that exactly abuts against but no longer supports the top cap. The method includes: a cell combining operation step: flipping, by using the cell combining apparatus, bodies of two bare battery cells disposed in parallel from a lying state to an upright cell combining state in a case that the top cap of the bare battery cell is supported by the top cap carrying apparatus at the carrying position, where in the upright cell combining state, the body of the bare battery cell is completely held by a holding apparatus and a tab back faces outward; a top cap carrying apparatus moving step: driving, by a first drive mechanism under the control of the control apparatus, the top cap carrying apparatus to move from the carrying position to the displacement position, to allow an anode tab and a cathode tab to extend to expose an anode tab back part and a cathode tab back part within a desired range; an image acquisition step: respectively performing image acquisition on the anode tab back part and the cathode tab back part laterally by using the first detection apparatus and the second detection apparatus; an image processing step: receiving, by using the control apparatus, images acquired by the first detection apparatus and the second detection apparatus, and performing image processing; and a determining step: determining, according to the processed images, whether defects exist in the anode tab back part and the cathode tab back part, for use in a subsequent process.

Therefore, the detection method of the present disclosure can implement online detection on the anode tab back part and the cathode tab back part, so as to obtain more comprehensive information of quality of the tab back, for use in a subsequent process.

According to one or more embodiments, a pair of first detection apparatuses is disposed on opposite sides of the cell combining apparatus in alignment with each other. A pair of second detection apparatuses is disposed on the opposite sides of the cell combining apparatus in alignment with each other. The method includes the following steps: respectively performing, by using the pair of first detection apparatuses, image acquisition on the anode tab back parts of the two bare battery cells disposed in parallel; and respectively performing, by using the pair of second detection apparatuses, image acquisition on the cathode tab back parts of the two bare battery cells disposed in parallel.

Therefore, in the detection method of the present disclosure, a desired focal length and a field of view of each detection apparatus are used for implementing online detection on the corresponding tab back parts of the two bare battery cells disposed in parallel, so as to obtain high-quality images reflecting the quality of the tab back.

According to one or more embodiments, the first detection apparatus and the second detection apparatus each include an image acquisition mechanism and a light source. The light source includes a coaxial light source disposed coaxially with the image acquisition mechanism and a first strip-shaped light source and a second strip-shaped light source disposed on two sides of the coaxial light source. The method includes the following steps: controlling, by using the control apparatus, to turn on the coaxial light source, to enable the image acquisition mechanism to acquire an image having a first exposure; or controlling, by using the control apparatus, to turn on the coaxial light source, the first strip-shaped light source, and the second strip-shaped light source at the same time, to enable the image acquisition mechanism to acquire an image having a second exposure.

Therefore, optional sufficient supplementary light may be provided for the image acquisition mechanism according to an actual requirement, so as to acquire high-quality images having a desired exposure.

According to one or more embodiments, the cell combining apparatus includes a cell combining flipping mechanism and a second drive mechanism. The cell combining operation step includes: driving, by using the second drive mechanism, the cell combining flipping mechanism, and driving the holding apparatus to gradually flip, so that the body of the bare battery cell is displaced from the lying state to the upright cell combining state.

Therefore, according to the cell combining operation step, the body of the bare battery cell is smoothly displaced into the upright cell combining state.

According to one or more embodiments, the cell combining apparatus further includes a third drive mechanism for driving the holding apparatus. The cell combining operation step includes: driving, by using the third drive mechanism, the holding apparatus to gradually clamp the body of the bare battery cell in a flipping operation process, until the body of the bare battery cell is completely carried by the holding apparatus when the body of the bare battery cell is in the upright cell combining state.

Therefore, according to the cell combining operation step, the holding apparatus gradually clamps the body of the bare battery cell, so that a possibility of cracking a tab located between the body of the bare battery cell and the top cap can be reduced.

BRIEF DESCRIPTION OF THE DRAWINGS

These and various other advantages and benefits of the present disclosure will become apparent to those of ordinary skill in the art upon reading the following detailed descriptions of the preferred implementations. The accompanying drawings are merely used for illustrating the preferred implementations and are not intended to constitute a limitation on the present disclosure. In addition, in all the accompanying drawings, same parts are indicated by the same reference numerals.

Figure 1:
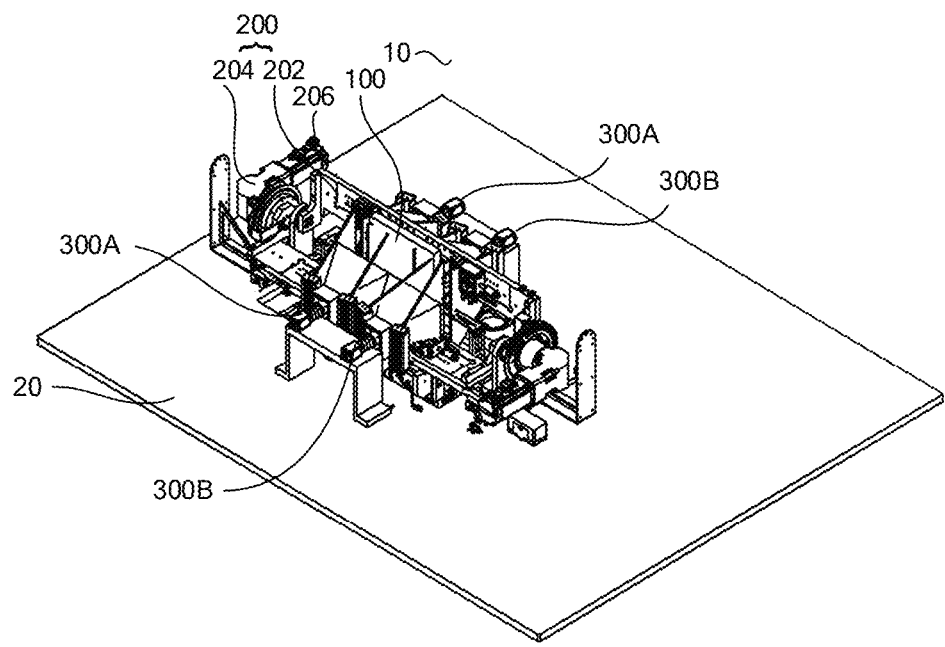
FIG. 1 schematically shows a perspective view of a detection system according to one or more embodiments of the present disclosure.

Descriptions of reference numerals: 10—detection system, 20—platform, 100—bare battery cell, 110—body, 112—anode tab, 114—cathode tab, 116—top cap, 200—cell combining apparatus, 202—cell combining flipping mechanism, 204—second drive mechanism, 206—second drive motor, 208—fixed base, 210—rotation block, 212—rotation bearing, 214—transmission plate, 216—limiting slot, 300A—first detection apparatus, 300B—second detection apparatus, 310—image acquisition mechanism, 312—imaging apparatus, 314—imaging lens, 320—coaxial light source, 330—first strip-shaped light source, 332—second strip-shaped light source, 340—mounting member, 400—top cap carrying apparatus, 402—support plate, 404—first drive mechanism, 406—limiting fixture, 408—accommodating groove, 410—first drive motor, 412—connection plate, 414—limiting plate, 500—holding apparatus, 502—clamping portion, 504—clamping member, 506—clamping rod, 508—battery cell clamping block, 510—upper clamping portion, 512—lower clamping portion, 514—third drive mechanism, 516—clamping groove, 518—third drive motor, 520—drive connection plate, and 522—cushion block.

DETAILED DESCRIPTION

Various embodiments of the technical solutions of the present disclosure will be described in detail below with reference to the accompanying drawings. The following embodiments are only used for illustrating the technical solutions of the present disclosure more explicitly, and are thus only interpreted as examples, rather than used to limit the protection scope of the present disclosure.

Unless otherwise defined, meanings of all technical and scientific terms used in this specification are the same as those usually understood by a person skilled in the art to which the present disclosure belongs. Terms used in this specification are merely intended to describe objectives of specific embodiments, but are not intended to limit the present disclosure. The terms "include/comprise" and "have" and any variations thereof in the specification and claims of the present disclosure are intended to cover non-exclusive inclusions.

In the descriptions according to the embodiments of the present disclosure, the technical terms "first", "second", and the like are only used for distinguishing different objects, and should not be understood as indicating or implying relative importance or implying the number, specific order or primary and secondary relationship of indicated technical features. In the descriptions according to the embodiments of the present disclosure, "a plurality of" means two or more, unless otherwise expressly and specifically defined.

Reference herein to "an embodiment" means that a particular feature, structure, or characteristic described in connection with the embodiment may be included in at least one embodiment of the present disclosure. The presence of the phrase in various places in the specification does not necessarily refer to the same embodiment, nor is it an independent or alternative embodiment that is mutually exclusive from other embodiments. A person skilled in the art explicitly or implicitly understands that the embodiments described in the specification may be combined with other embodiments.

In the descriptions of the embodiments of the present disclosure, the term "and/or" is merely an association to describe associated objects, and means that there are three relationships. For example, A and/or B may mean that A exists alone, A and B exist at the same time, and B exists alone.

In the descriptions of the embodiments of the present disclosure, the directions or positional relationships indicated by the technical terms shown in the drawings are only for the convenience of describing the embodiments of the present disclosure and simplifying the descriptions, rather than indicating or implying that the involved device or element should have a specific orientation or should be configured or operated in the specific orientation, therefore, they cannot be understood as limiting the embodiments of the present disclosure.

In the descriptions of the embodiments of the present disclosure, unless otherwise explicitly specified and limited, the technical terms "mount", "connection", and "fix" should be understood in a broad sense. For example, the connection may be a fixed connection, a detachable connection, or an integral connection. Alternatively, the connection may be a direct connection or an indirect connection through an intermediary. A person of ordinary skill in the art may understand specific meanings of the terms in the embodiments of the present disclosure based on specific situations.

A bare battery cell described in this specification is a single electromagnetic battery cell on which a positive electrode and a negative electrode are already disposed on a top surface. The bare battery cell does not include a protective circuit board and a shell, and cannot be directly used. A surface of the bare battery cell opposite to the top surface is referred to as a bottom surface, a pair of side surfaces having larger cross sections is referred to as large side surfaces, and a pair of side surfaces having smaller cross sections is referred to as small side surfaces.

In the foregoing cell combining operation of two bare battery cells, a body of the bare battery cell needs to be "lifted up" by 90 degrees relative to a welded top cap. Consequently, a tab between the body of the bare battery cell and the top cap is prone to breakage due to a bending force in the process of "lifting up" by 90 degrees. Especially, a back part of the tab facing outward is prone to cracking. In the related art, a detection system and method for performing online detection on a combined bare battery cell to detect whether a defect such as cracking exists in a tab back of the bare battery cell.

Based on the foregoing consideration, a cracking status of the tab back needs to be detected online during the cell combining operation, so as to provide quality reference for a subsequent process. In addition, during the cell combining operation, the tab of the bare battery cell is always in a bent state because the tab and the top cap are still supported by the top cap carrying apparatus when the body is in an upright cell combining state. In this way, the cracking status of the entire tab back cannot be detected. In view of this, it is desired that during detection, the tab can at least partially extend to a desired degree, so as to perform comprehensive and complete online detection on the tab. After detection, a subsequent cell combining operation may be continued.

Therefore, the present disclosure provides a detection system and a detection method for detecting a tab back of a bare battery cell in a cell combining apparatus.

The detection system and the detection method according to the present disclosure are described below with reference to the accompanying drawings.

Figure 2:
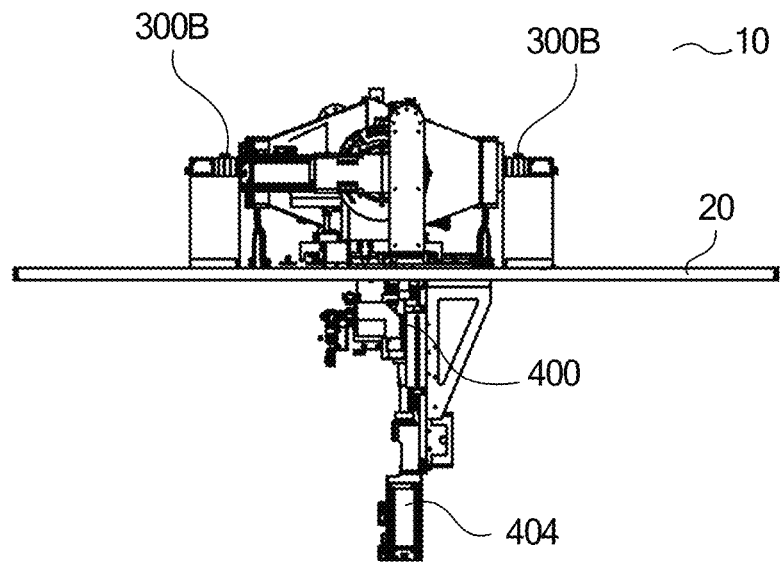
FIG. 2 schematically shows a side view of a detection system according to one or more embodiments of the present disclosure.
Figure 3:
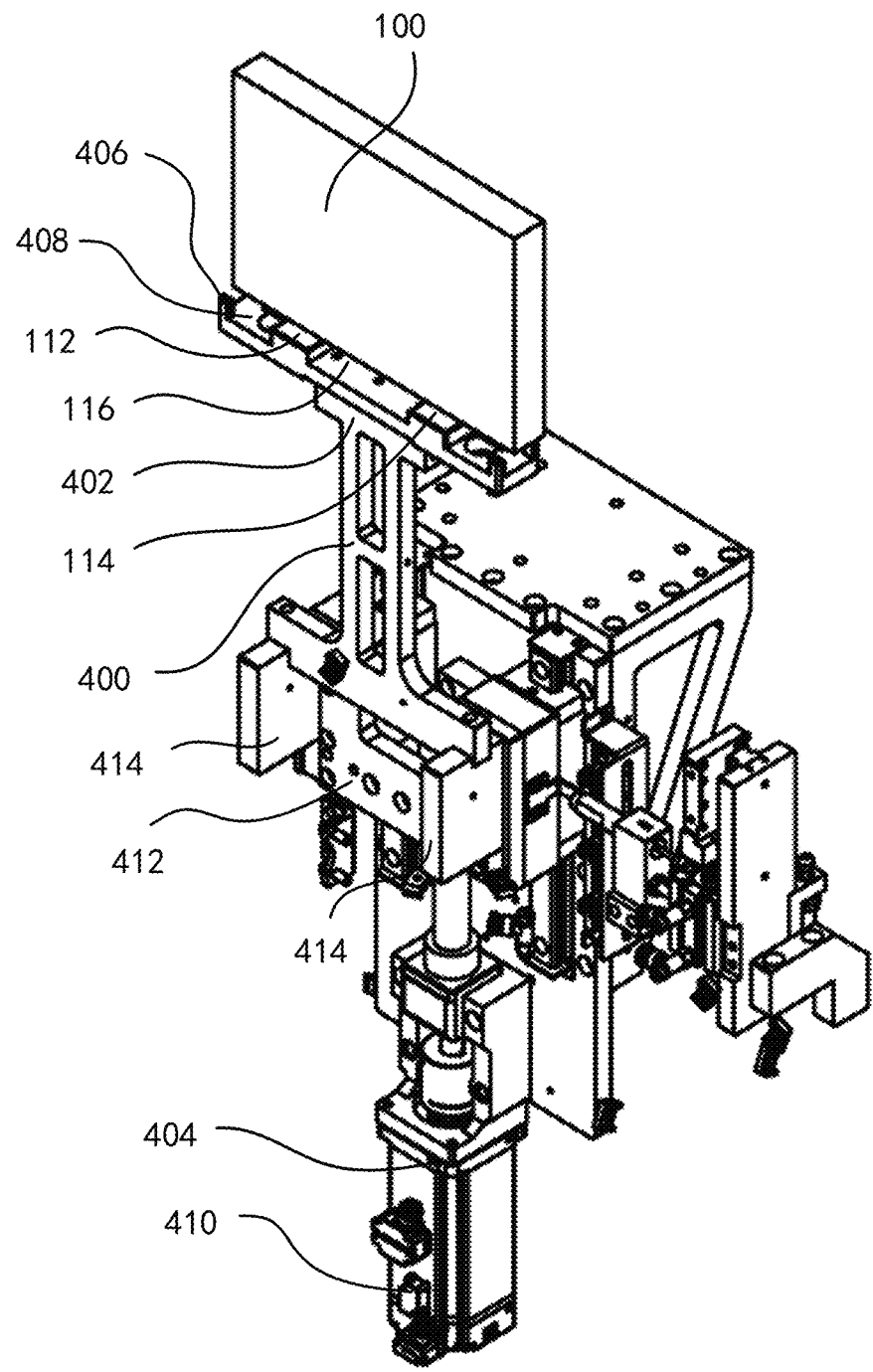
FIG. 3 schematically shows a perspective view of the detection system shown in FIG. 1 after a part of the structure is removed to present a top cap carrying apparatus and a first drive mechanism.
Figure 4:
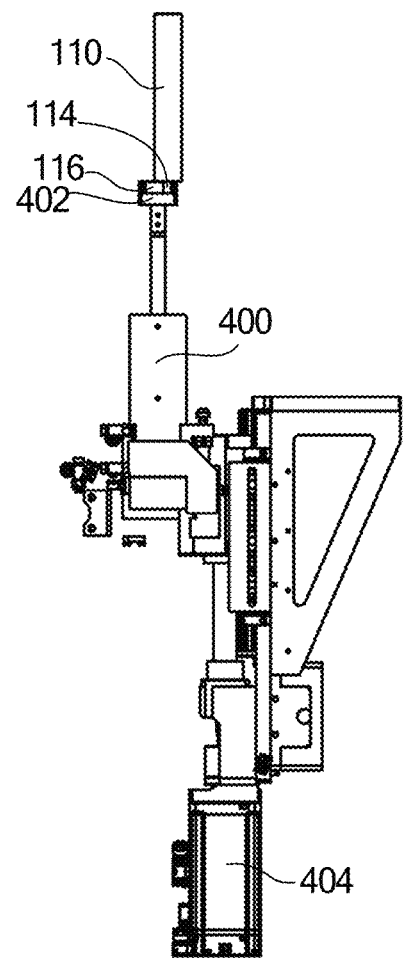
FIG. 4 schematically shows a side view of the detection system shown in FIG. 1 after a part of the structure is removed to present a top cap carrying apparatus and a first drive mechanism.

FIG. 1 and FIG. 2 respectively schematically show a perspective view and a side view of a detection system according to one or more embodiments of the present disclosure. FIG. 3 and FIG. 4 respectively schematically show a perspective view and a side view of the detection system shown in FIG. 1 after a part of the structure is removed to present a top cap carrying apparatus and a first drive mechanism.

According to one or more embodiments, referring to FIG. 1 and FIG. 2, a detection system 10 for detecting a tab back of a bare battery cell in a cell combining apparatus 200 is provided. The detection system 10 includes a top cap carrying apparatus 400, a cell combining apparatus 200, a first detection apparatus 300A, a second detection apparatus 300B, and a control apparatus. The top cap carrying apparatus 400 is movable at least between a carrying position that supports a top cap 116 of a bare battery cell and a displacement position that exactly abuts against but no longer supports the top cap. The top cap 116 of the bare battery cell is welded together with an anode tab 112 and a cathode tab 114. The cell combining apparatus 200 is configured to displace bodies 110 of two bare battery cells 100 disposed in parallel from a lying state to an upright cell combining state in a case that the top cap 116 of the bare battery cell is supported by the top cap carrying apparatus 400. In the upright cell combining state, the body 110 of the bare battery cell is completely held by a holding apparatus 500 and a tab back faces outward. The top cap carrying apparatus 400 is configured to move, under a drive of a first drive mechanism 404, from the carrying position to the displacement position after the bare battery cell 100 is in the upright cell combining state, to allow the anode tab 112 and the cathode tab 114 to extend to expose an anode tab back part and a cathode tab back part within a desired range. The first detection apparatus 300A and the second detection apparatus 300B each include an image acquisition mechanism 310. The first detection apparatus 300A is configured to perform image acquisition on the anode tab back part laterally. The second detection apparatus 300B is configured to perform image acquisition on the cathode tab back part laterally. The control apparatus is configured to control the cell combining apparatus 200 to flip the body 110 of the bare battery cell from the lying state to the upright cell combining state, control movement of the top cap carrying apparatus 400, control image acquisition by the first detection apparatus 300A and the second detection apparatus 300B, and receive and process acquired images, to determine whether defects exist in the anode tab back part and the cathode tab back part, for use in a subsequent process.

Referring to FIG. 1 and FIG. 2, in this specification, the term "lying state" means that a large side surface of the bare battery cell 100 is horizontally carried by a body of the holding apparatus 500. The term "upright cell combining state" means that the large side surface of the bare battery cell is vertically carried relative to a horizontal plane and a top surface of the bare battery cell having the anode tab 112 and the cathode tab 114 faces downward. In this case, a weight of the bare battery cell in the upright cell combining state is completely held by the holding apparatus 500. The term "tab back part" is an outer tab side surface part for performing online detection after the anode (cathode) tabs of two bare battery cells 100 at least partially extend when the two bare battery cells are placed in the upright cell combining state facing each other. In this case, sides of the two bare battery cells facing each other are referred to as "inner sides", and sides facing away from each other are referred to as "outer sides". In this specification, the term "longitudinal direction" is a direction along which a flipping axis of the cell combining apparatus 200 disposed on a platform 20 of the detection system 10 extends, and a direction parallel to the platform 20 and perpendicular to the flipping axis is referred to as a "lateral direction". A direction that is perpendicular to the platform 20, faces upward, and is perpendicular to the flipping axis is referred to as an "upward direction", and a direction opposite to the "upward direction" is referred to as a "downward direction".

Referring to FIG. 1 and FIG. 2, the top cap carrying apparatus 400 protrudes from a position below the platform 20 to a position above the platform along the upward direction, and is configured to support the top cap 116 of the bare battery cell 100 in a cell combining operation. It should be noted that in the embodiments of the present disclosure, a structure and layout of the top cap carrying apparatus 400 are not specifically limited, provided that the function thereof can be implemented. The cell combining apparatus 200, the first detection apparatus 300A, and the second detection apparatus 300B are all disposed above the platform 20, and opposite sides of the cell combining apparatus 200 are correspondingly disposed at a distance from the bare battery cell 100, so as to perform image acquisition on the anode (cathode) tab back part of the bare battery cell 100. It should be noted that in the embodiments of the present disclosure, structures and layouts of the cell combining apparatus 200, the first detection apparatus 300A, and the second detection apparatus 300B are not specifically limited, provided that the function thereof can be implemented. Before the flipping operation in which the cell combining apparatus 200 displaces the body of the bare battery cell 100 from the lying state to the upright cell combining state, the large side surfaces of the bodies 110 of the two bare battery cells disposed in parallel are horizontally carried by the body of the holding apparatus 500 to be in the lying state. The anode tab 112 and the cathode tab 114 of the bare battery cell are both welded with the top cap 116 of the bare battery cell together, and the top cap 116 is supported by the top cap carrying apparatus 400. In other words, the top cap 116 and the body 110 of the bare battery cell 100 are initially two separate components, and both the anode tab 112 and the cathode tab 114 of the bare battery cell 100 are welded between the top cap 116 and the body 110 in a straight extending manner. When the flipping operation is performed on the bare battery cell, the top cap 116 is always supported by the top cap carrying apparatus 400, and the body 110 is moved from the lying state to the upright cell combining state. In addition, during the flipping operation, as the cell combining apparatus 200 flips the bare battery cell, the body 110 of the bare battery cell held by the holding apparatus 500 slowly performs circular motion, so that the bodies 110 of the two bare battery cells gradually approach each other, and a clamping force of the holding apparatus 500 is gradually increased, until the clamping force of the holding apparatus is large enough to bear the entire weight of the bare battery cell when the body 110 of the bare battery cell is in the upright cell combining state. In other words, in this case, the body of the holding apparatus 500 is completely adhered to the body of the bare battery cell, and there is a certain moment, so as to prevent the body of the bare battery cell from tipping over. During the circular motion of the body of the bare battery cell, because the top cap 116 is always supported by the top cap carrying apparatus 400, the anode tab 112 and the cathode tab 114 located between the body 110 of the bare battery cell and the top cap 116 are bent due to 90-degree flipping of the body of the bare battery cell, which may cause forced cracking of a surface layer of the tab back facing outward, thereby causing a defective bare battery cell. In this case, the bare battery cell needs to be detected online.

Referring to FIG. 3 and FIG. 4, the top cap carrying apparatus 400 is movable. Specifically, the top cap carrying apparatus 400 is liftable. The top cap carrying apparatus 400 is configured to be movable at least between the carrying position and the displacement position. In this way, the top cap carrying apparatus 400 may provide an optional and desired detection range for an anode (cathode) tab. At the carrying position, a support plate 402 of the top cap carrying apparatus 400 supports the top cap 116 of the bare battery cell 100. At the displacement position, the support plate 402 of the top cap carrying apparatus 400 exactly abuts against but no longer supports the top cap 116, thereby allowing the anode tab 112 and the cathode tab 114 of the bare battery cell 100 to fully extend, for example, extend to be in a natural extension state. Certainly, the top cap carrying apparatus 400 may be moved beyond the carrying position and the displacement position, provided that online detection is not affected. The top cap carrying apparatus 400 may be driven by the first drive mechanism 404 operatively connected thereto to move (for example, move along the downward direction as shown in the figure) from the carrying position to the displacement position away from the body 110 of the bare battery cell by a distance, to allow the anode tab 112 and the cathode tab 114 of the bare battery cell 100 to at least partially extend, thereby providing a desired detection range. Because the weight of the bare battery cell 100 in the upright cell combining state is entirely held by the holding apparatus 500, in this case, the top cap carrying apparatus 400 abutting against the top cap 116 is moved downward by a distance to at least partially release an upward support force for the bent anode tab 112 and cathode tab 114 and the top cap 116, and allow the anode tab 112 and the cathode tab 114 to extend downward to expose the anode tab back part and the cathode tab back part within a desired range. The desired range of the anode (cathode) tab back part depends on desired downward extension of the anode (cathode) tab and/or downward movement of the top cap carrying apparatus.

The first detection apparatus 300A and the second detection apparatus 300B each include an image acquisition mechanism 310, and may be configured to perform image acquisition on the anode tab back part and the cathode tab back part laterally. In the shown embodiment, the image acquisition mechanism 310 is disposed on the platform 20 by using a mounting member. The image acquisition mechanism 310 is suitable for performing high-quality image acquisition on the anode (cathode) tab back part of the bare battery cell 100 laterally. In other words, particularly referring to FIG. 6, a vertical distance of the image acquisition mechanism 310 relative to the bare battery cell 100 is set to be suitable for enabling the anode (cathode) tab back part of the bare battery cell to be located at a center of a field of view of the image acquisition mechanism 310. A horizontal distance between the image acquisition mechanism 310 and the bare battery cell 100 is suitable for enabling the bare battery cell 100 to be within a focal length range of the image acquisition mechanism 310, so as to obtain a clear image.

The detection system 10 of the present disclosure is further provided with the control apparatus (not shown), to control operations of the cell combining apparatus 200, the first detection apparatus 300A, the second detection apparatus 300B, the top cap carrying apparatus 400, and the like. Specifically, the control apparatus may be configured to control the cell combining apparatus 200 to flip the body of the bare battery cell 100 from the lying state to the upright cell combining state. The control apparatus may be configured to control the first detection apparatus 300A and the second detection apparatus 300B to acquire images of the anode tab back part and the cathode tab back part, receive the images acquired by the first detection apparatus 300A and the second detection apparatus 300B, and perform image processing, to determine whether a defect exists in the tab back, for use in a subsequent process. It should be noted that in the embodiments of the present application, a structure and layout of the control apparatus are not specifically limited, provided that the function thereof can be implemented. For a subsequent process, for example, a bare battery cell determined to be qualified may be delivered to a next process, or may be temporarily stored into a warehouse, for use in subsequent production. In addition, a bare battery cell determined to be unqualified may be directly removed out of a production line as a waste product, or may be temporarily marked, and is left to be discarded in a subsequent process.

Therefore, the detection system of the present disclosure implements online detection on the anode tab back part and the cathode tab back part of the bare battery cell by using the mobility of the top cap carrying apparatus, thereby obtaining more comprehensive information of quality of the tab back.

According to one or more embodiments, referring to FIG. 1 and FIG. 2, a pair of first detection apparatuses 300A is disposed on opposite sides of the cell combining apparatus 200 in alignment with each other, so as to respectively perform image acquisition on the anode tab back parts of the two bare battery cells disposed in parallel. A pair of second detection apparatuses 300B is disposed on the opposite sides of the cell combining apparatus in alignment with each other, so as to respectively perform image acquisition on the cathode tab back parts of the two bare battery cells disposed in parallel. Therefore, a high-quality image may be acquired from each tab back part. In other words, a total of four tabs of the two bare battery cells disposed in parallel each are provided with a detection apparatus. According to a requirement, the control apparatus may simultaneously or separately control image acquisition operations of the pair of first detection apparatuses 300A and the pair of second detection apparatuses 300B.

Therefore, the detection system of the present disclosure can implement online detection on all the tab back parts of the two bare battery cells disposed in parallel, so as to respectively obtain high-quality images, thereby obtaining more comprehensive information of the quality of the tab back.

According to one or more embodiments, the top cap carrying apparatus 400 includes the support plate 402 and the first drive mechanism 404. The support plate 402 is configured to support the top cap of the bare battery cell, and the first drive mechanism 404 is disposed on the platform 20. The first drive mechanism 404 is connected to the support plate 402. The first drive mechanism 404 is connected to the support plate 402, and is capable of driving the support plate 402 to move in a direction from the bare battery cell 100 to the platform 20, so that the anode tab 112 and the cathode tab 114 extend.

In the foregoing structure, the first drive mechanism 404 can provide a drive force for movement of the support plate 402, and the support plate 402 can transfer the drive force of the first drive mechanism 404 to the top cap of the bare battery cell 100. By adjusting a movement distance of the support plate 402, the top cap of the bare battery cell 100 may be moved between the top cap carrying position and the displacement position, to adjust extension states of the anode tab and the cathode tab.

In one embodiment, a distance between the top cap of the bare battery cell 100 and the first drive mechanism 404 can be controlled by adjusting a length of the support plate 402, thereby effectively improving adaptability of the first drive mechanism 404 to different bare battery cells.

According to one or more embodiments, the first drive mechanism 404 further includes a limiting fixture 406. The limiting fixture 406 is disposed at an end of the support plate 402 facing the bare battery cell 100. A surface of a side of the limiting fixture 406 facing the bare battery cell is recessed to form an accommodating groove 408. A shape of the accommodating groove 408 matches that of the top cap of the bare battery cell.

In the foregoing structure, the limiting fixture 406 can guide a movement direction of the top cap of the bare battery cell, thereby reducing a risk that the top cap of the bare battery cell is deformed and displaced in a flipping process, improving detection accuracy, and improving structural integrity of the bare battery cell.

According to one or more embodiments, the first drive mechanism 404 further includes a first drive motor 410 and a limiting assembly. The limiting assembly includes a connection plate 412 and two limiting plates 414. The connection plate 412 is connected to the first drive motor 410, and the two limiting plates 414 are connected to the connection plate 412. Surfaces of sides of the two limiting plates 414 facing away from the first drive motor 410 are recessed to form limiting grooves. The limiting grooves are configured to accommodate a part of the support plate 401 to limit movement of the support plate 401 relative to the connection plate 412.

In the foregoing structure, the connection plate 412 is disposed to connect the two limiting plates 414 to the first drive motor 410, and the limiting plates 414 are provided with the limiting grooves to limit a position of the support plate 402, thereby reducing a risk that the support plate 402 is displaced during movement, and improving stability in a detection process and accuracy of a detection result.

Figure 5:
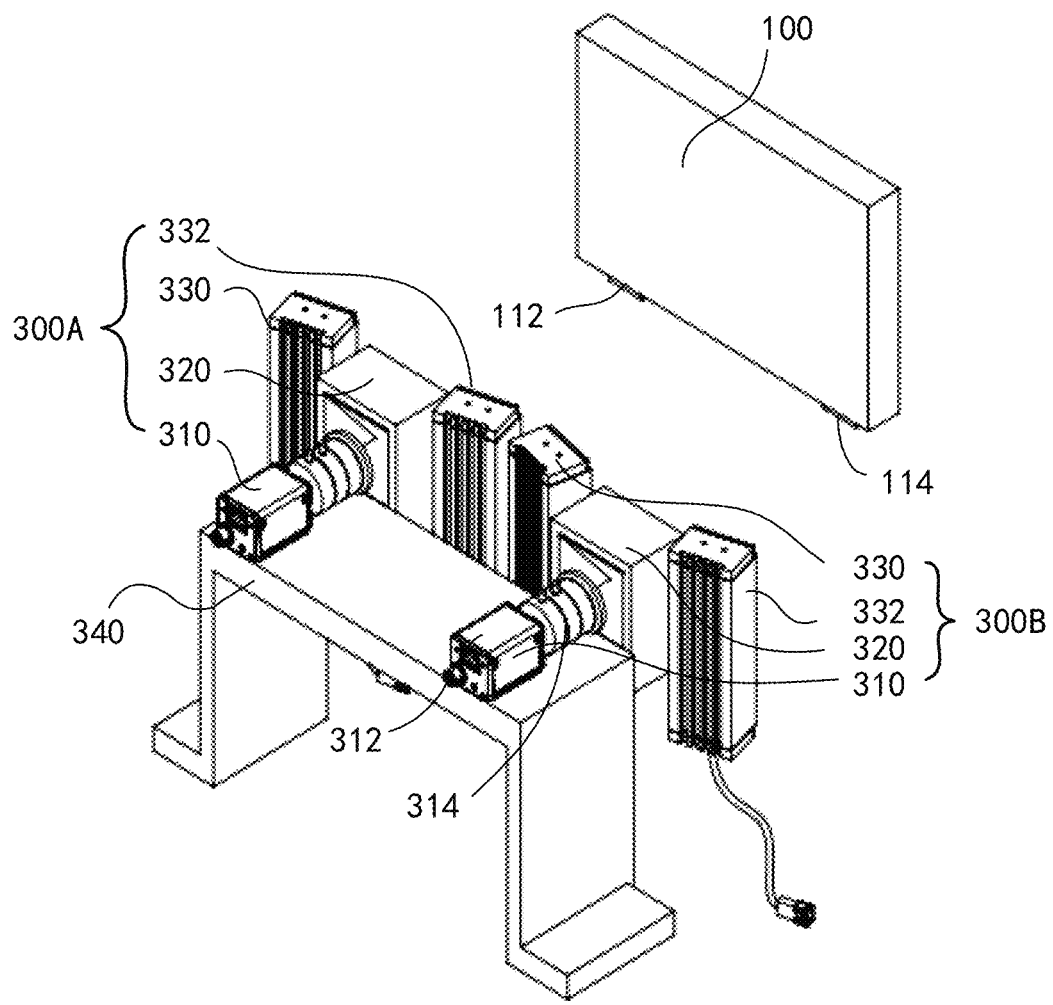
FIG. 5 schematically shows a perspective view of the detection system shown in FIG. 1 after a part of the structure is removed to present a detection apparatus and a bare battery cell.
Figure 6:
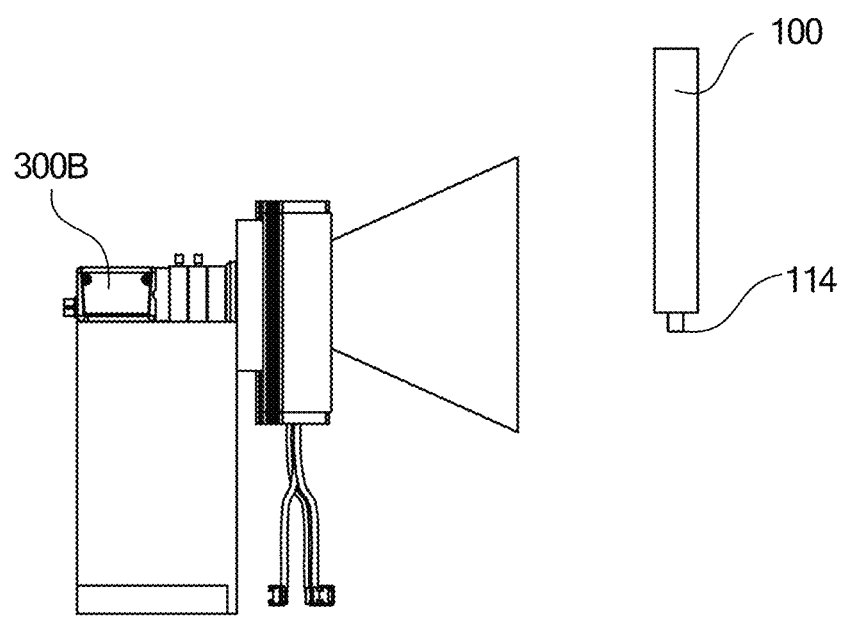
FIG. 6 schematically shows a side view of the detection system shown in FIG. 1 after a part of the structure is removed to present a detection apparatus and a bare battery cell.

FIG. 5 and FIG. 6 respectively schematically show a perspective view and a side view of the detection system shown in FIG. 1 after a part of the structure is removed to present a first detection apparatus, a second detection apparatus, and a bare battery cell.

According to one or more embodiments, referring to FIG. 5 and FIG. 6, the first detection apparatus 300A and the second detection apparatus 300B each further include a light source. The light source includes a coaxial light source 320 disposed coaxially with the image acquisition mechanism 310 and a first strip-shaped light source 330 and a second strip-shaped light source 332 disposed on two sides of the coaxial light source. The control apparatus is capable of controlling to turn on the coaxial light source 320, to enable the image acquisition mechanism 310 to acquire an image having a first exposure. Alternatively, the control apparatus is capable of controlling to turn on the coaxial light source 320, the first strip-shaped light source 330, and the second strip-shaped light source 332 at the same time, to enable the image acquisition mechanism 310 to acquire an image having a second exposure.

Referring to FIG. 1, FIG. 5, and FIG. 6, the first detection apparatus 300A and the second detection apparatus 300B each include the image acquisition mechanism 310, the coaxial light source 320, the first strip-shaped light source 330, and the second strip-shaped light source 332.

The light source may include the coaxial light source 320, the first strip-shaped light source 330, and the second strip-shaped light source 332. Referring to FIG. 5, the coaxial light source 320 is disposed between the image acquisition mechanism 310 and the bare battery cell 100. It should be noted that in the embodiments of the present application, a specific structure of the coaxial light source 320 is not limited, provided that a central axis of the coaxial light source 320 and an optical axis of the image acquisition mechanism 310 are disposed on a same axis. The coaxial light source 320 may provide straight and uniform supplementary light for the image acquisition mechanism 310. The two strip-shaped light sources 330 are disposed between the image acquisition mechanism 310 and the bare battery cell 100 and on both sides of the coaxial light source 320. The two strip-shaped light sources 330 may provide supplementary light converging from two lateral directions to the image acquisition mechanism 310. It should be noted that in the embodiments of the present application, a specific structure of the strip-shaped light source 330 is not limited, and a light source having any geometric shape may be used.

The control apparatus may control to turn on the light sources to provide supplementary light for the image acquisition mechanism 310, so as to obtain high-quality images. When the image acquisition mechanism 310 performs image acquisition, the control apparatus may selectively control illumination of the light sources, so that only the coaxial light source 320 illuminates, to enable the image acquisition mechanism to acquire an image having a first exposure. Alternatively, the coaxial light source and the two strip-shaped light sources 330 simultaneously illuminate, to enable the image acquisition mechanism to acquire an image having a second exposure. Therefore, the arrangement and illumination combination of the coaxial light source and the strip-shaped light sources may provide optional sufficient supplementary light for the image acquisition mechanism, so that the image acquisition mechanism may acquire high-quality images having a desired exposure according to an actual requirement.

According to one or more embodiments, the first detection apparatus 300A further includes a mounting member 340 disposed on the platform 20. The image acquisition mechanism includes an imaging apparatus 312 and an imaging lens 314. The imaging apparatus 312 and the imaging lens 314 are disposed on the mounting member 340. The imaging lens 314 is disposed between the imaging apparatus 312 and the coaxial light source 320. Exemplarily, the imaging apparatus 312 may be a digital camera or a video camera. The imaging lens 314 may be a lens for focusing or improving photographing precision, which matches the imaging apparatus 312.

In the foregoing structure, the imaging apparatus 312 is disposed to obtain images of the back parts of the cathode tab 114 and the anode tab 112, so as to implement image acquisition. The imaging lens 314 is disposed to collect light from a photographed object, thereby improving an imaging effect of the imaging apparatus 312, and improving detection accuracy.

Figure 7:
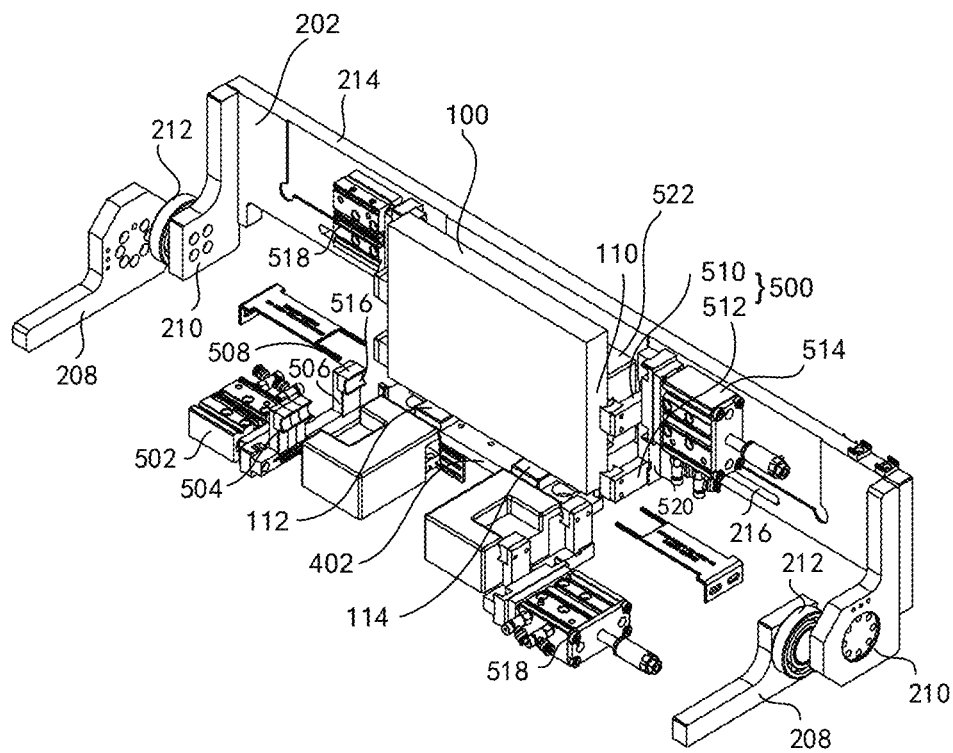
FIG. 7 schematically shows a perspective view of the detection system shown in FIG. 1 after a part of the structure is removed to present a cell combining apparatus in which a bare battery cell has been flipped to an upright cell combining state.

FIG. 7 schematically shows a perspective view of the detection system shown in FIG. 1 after a part of the structure is removed to present a cell combining apparatus in which a bare battery cell has been flipped to an upright cell combining state.

According to one or more embodiments, referring to FIG. 1 and FIG. 7, the cell combining apparatus 200 includes a cell combining flipping mechanism 202 and a second drive mechanism 204. The cell combining flipping mechanism 202 is configured to be driven by the second drive mechanism 204 to gradually flip and displace the body of the bare battery cell 100 from the lying state to the upright cell combining state.

It should be noted that in the embodiments of the present application, a specific structure of the cell combining apparatus 200 is not limited, provided that the function thereof can be implemented. Referring to FIG. 1 and FIG. 7, under the control of the control apparatus, the cell combining apparatus 200 can be driven by the second drive mechanism 204 to perform a flipping operation on the bare battery cell 100, so that the body of the bare battery cell is gradually flipped by 90 degrees from the lying state along a circular path to be displaced to the upright cell combining state.

Therefore, the cell combining apparatus easily implements smooth and stable flipping of the bare battery cell.

According to one or more embodiments, the second drive mechanism 204 includes a second drive motor 206, a fixed base 208, a rotation block 210, and a rotation bearing 212. The second drive motor 206 and the fixed base 208 are disposed on the platform 20. The rotation block 210 is disposed on a side of the fixed base 208 facing away from the second drive motor 206. An output shaft of the second drive motor 206 passes through the fixed base 208 to be connected to the rotation block 210. The second drive motor 206 drives the rotation block 201 to rotate about the output shaft of the second drive motor, and the holding apparatus is connected to the rotation block. The rotation bearing 212 is disposed between the rotation block 210 and the fixed base 208, so as to connect the rotation block 210 to the fixed base 208 rotatably.

In the foregoing structure, the second drive motor 206 is disposed to drive the rotation block 210 to rotate, and the fixed base 208 can support the output shaft of the second drive motor 206 and the rotation block 210. The rotation block 210 is configured to drive the holding apparatus 500 to rotate, and the rotation bearing 212 connects the rotation block 210 to the fixed base 208 rotatably, thereby reducing resistance and friction in a rotation process of the rotation block 210, improving stability in the rotation process to improve accuracy of detection, and reducing structural damage to the bare battery cell 100 in the rotation process to maintain the structural integrity of the bare battery cell 100.

According to one or more embodiments, a quantity of the fixed bases 208 is two, and two rotation blocks 210 and two rotation bearings 212 are correspondingly provided. The cell combining flipping mechanism 202 further includes a transmission plate 214. The transmission plate 214 is connected between the two rotation blocks 210. The holding apparatus 500 is disposed on the transmission plate 214.

In the foregoing structure, the two fixed bases 208 and the two rotation blocks 210 are disposed to connect two ends of the transmission plate 214, thereby improving balance of force on the transmission plate 214 and improving stability in the rotation process.

According to one or more embodiments, referring to FIG. 1 and FIG. 7, the cell combining apparatus 200 further includes a third drive mechanism 514 for driving the holding apparatus 500. The third drive mechanism is configured to drive the holding apparatus 500 to gradually clamp the body 110 of the bare battery cell in a flipping operation process, until the body of the bare battery cell is completely carried by the holding apparatus 500 when the body of the bare battery cell is in the upright cell combining state.

It should be noted that in the embodiments of the present application, specific structures of the holding apparatus 500 and the third drive mechanism 514 are not limited, provided that the functions thereof can be implemented. Referring to FIG. 7, the holding apparatus 500 may include a pair of upper clamping portions 510 and a pair of lower clamping portions 512. In a process in which the body of the bare battery cell is flipped from the lying state to the upright cell combining state, the body of the bare battery cell slowly performs circular motion to make the bodies 110 of the two bare battery cells gradually approach each other, and clamping forces provided by the upper clamping portion 510 and the lower clamping portion 512 of the holding apparatus 500 are gradually increased, until the clamping force is large enough to bear the entire weight of the bare battery cell when the body of the bare battery cell is in the upright cell combining state. In this case, the body of the holding apparatus is completely adhered to the body of the bare battery cell, and the upper clamping portion 510 and the lower clamping portion 512 respectively clamp the body of the bare battery cell 100 at an upper part and a lower part from a small side surface and provide a certain moment to the bare battery cell, so as to prevent the bare battery cell 100 from tipping over.

Therefore, slow flipping of the battery cell and gradual increase of the clamping force reduce as much as possible damage to an anode (cathode) tab located between the body of the bare battery cell and the top cap, for example, crack caused by excessively fast bending of the anode (cathode) tab.

According to one or more embodiments, the holding apparatus 500 includes a clamping portion 502 disposed on the transmission plate. The clamping portion 502 includes two clamping members 504 disposed opposite to each other. A space between the two clamping members 504 is configured for clamping the bare battery cell. According to the foregoing structure, the clamping member 504 is disposed on the transmission plate 214. The clamping member 504 can move with movement of the transmission plate 214, and clamp the bare battery cell 100 for flipping. The two clamping members 504 are disposed to clamp the bare battery cell 100 from two sides, thereby improving a clamping force and stability in the flipping process.

According to one or more embodiments, the clamping member 504 includes a clamping rod 506 and a battery cell clamping block 508. One end of the clamping rod 506 is connected to the transmission plate 214. The battery cell clamping block 508 is disposed at the other end of the clamping rod 506. The battery cell clamping block 508 is configured to clamp the bare battery cell 100 and drive the bare battery cell 100 to flip. A surface of the battery cell clamping block 508 facing the bare battery cell 100 is recessed to form a clamping groove 516. A shape of the clamping groove 516 matches a shape of the surface of the bare battery cell 100.

In the foregoing structure, the clamping rod 506 is disposed to apply a clamping force to the bare battery cell 100 with movement of the transmission plate 214, and to transfer the clamping force to the bare battery cell 100 by using the battery cell clamping block 508. The clamping groove 516 is provided on the battery cell clamping block 508 to reduce deformation caused by the clamping force on the surface of the bare battery cell 100, thereby protecting the surface of the bare battery cell 100, and improving structural integrity of a detected battery.

According to one or more embodiments, the third drive mechanism 514 includes a third drive motor 518. The third drive motor 518 is disposed on the transmission plate 214. The clamping rod 506 is connected to the third drive motor 518. In the foregoing structure, the third drive motor 518 is disposed to transfer a drive force to the holding apparatus 500, thereby driving the clamping rod 506 to move, and driving the clamping member 504 to clamp the bare battery cell. The clamping force of the clamping member 504 can be accurately adjusted by controlling the third drive motor 518, and the clamping force for the bare battery cell 100 is increased as a flipping angle increases, to improve stability in the flipping process of the bare battery cell 100.

According to one or more embodiments, the holding apparatus 500 further includes a drive connection plate 520. The drive connection plate 520 is connected to the third drive motor 518. The clamping rod 506 is disposed on the drive connection plate 520. There are two clamping portions 502, namely, an upper clamping portion 510 and a lower clamping portion 512. The upper clamping portion 510 and the lower clamping portion 512 are spaced apart on the drive connection plate 520.

In the foregoing structure, a plurality of clamping portions 502 are disposed to add clamping points of the bare battery cell 100, thereby improving clamping stability, and also improving clamping stability for the battery cell in the flipping process.

According to one or more embodiments, a surface of a side of the transmission plate 214 facing the drive connection plate 520 is recessed to form a limiting slot 216. The limiting slot 216 extends along an arrangement direction of the two clamping members 504. It may be understood that the two clamping members 504 herein are two clamping members 504 disposed on both sides of the bare battery cell 100 in a same clamping portion 502, and a space for clamping the bare battery cell 100 is formed between the two clamping members 504. A surface of a side of the drive connection plate 520 facing the limiting slot 216 protrudes to form a limiting portion. The limiting portion is disposed in the limiting slot 216. The limiting slot 216 is configured to limit movement of the drive connection plate 520 relative to the transmission plate 214. In the foregoing structure, the limiting slot 216 extends along the arrangement direction of the two clamping members 504, so that a movement direction of the drive connection plate 520 can be limited to a direction towards the other clamping member 504 or a direction away from the other clamping member 504, thereby reducing damage caused to an outer surface of the bare battery cell 100 in a process of moving the clamping members 504. In addition, the limiting slot 216 is provided, and the limiting portion is disposed in the limiting slot 216, so that a movement path of the limiting portion can be limited, thereby preventing damage to the bare battery cell 100 caused by an excessively large movement range of the clamping member 504. The foregoing structure improves stability in the detection process, and enhances protection on the detected bare battery cell 100.

According to one or more embodiments, the holding apparatus 500 further includes a cushion block 522. The cushion block 522 is disposed on a side of the transmission plate 214 facing the bare battery cell 100. In the foregoing structure, the cushion block 522 is disposed to support a side surface of the bare battery cell 100, thereby improving stability in the flipping process. In one embodiment, a thickness of the cushion block 522 may be adjusted according to bare battery cells 100 having different thicknesses, to adapt to testing of battery cells having different specifications.

Figure 8:
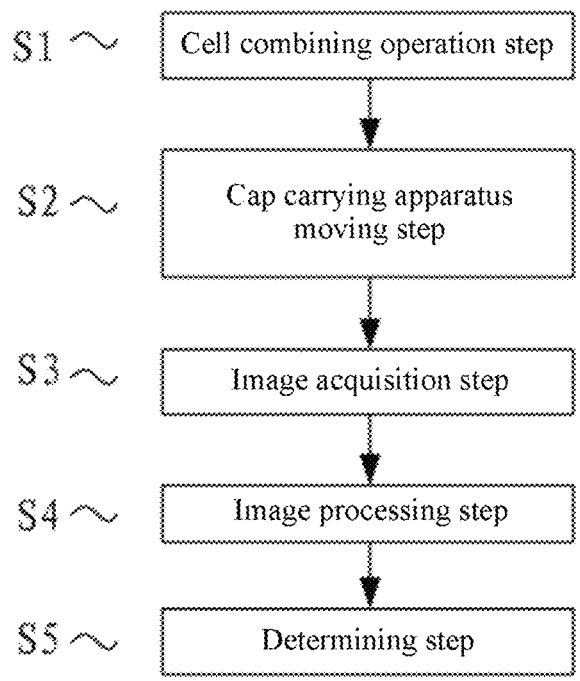
FIG. 8 schematically shows a flowchart of a detection method according to one or more embodiments of the present disclosure.

According to one or more embodiments, referring to FIG. 8, a detection method is provided. The detection method detects a tab back part of a bare battery cell 100 in a cell combining operation process of the bare battery cell by using a detection system 10. The detection system includes a top cap carrying apparatus 400, a cell combining apparatus 200, a first detection apparatus 300A, a second detection apparatus 300B, and a control apparatus. The top cap carrying apparatus 400 is configured to move between a carrying position that supports a top cap of the bare battery cell and a displacement position that exactly abuts against but no longer supports the top cap. The method includes a cell combining operation step S1, a top cap carrying apparatus moving step S2, an image acquisition step S3, an image processing step S4, and a determining step S5. In the cell combining operation step S1, bodies of two bare battery cells 100 disposed in parallel are flipped from a lying state to an upright cell combining state by using the cell combining apparatus 200 in a case that the top cap of the bare battery cell is supported by the top cap carrying apparatus 400, where in the upright cell combining state, the body of the bare battery cell is completely held by a holding apparatus 500 and a tab back faces outward. In the top cap carrying apparatus moving step S2, a first drive mechanism 404 drives, under the control of the control apparatus, the top cap carrying apparatus 400 to move from the carrying position to the displacement position, to allow an anode tab and a cathode tab to extend to expose an anode tab back part and a cathode tab back part within a desired range. In the image acquisition step S3, the first detection apparatus 300A and the second detection apparatus 300B respectively perform image acquisition on the anode tab back part and the cathode tab back part laterally. In the image processing step S4, the control apparatus receives images acquired by the first detection apparatus 300A and the second detection apparatus 300B, and performs image processing. In the determining step, according to the processed images, whether defects exist in the tab back parts is determined, for use in a subsequent process.

FIG. 8 shows a flowchart of a detection method according to the present disclosure. The detection method according to the present disclosure may be performed by using the detection system 10 according to the present disclosure. The detection method includes the following steps: the cell combining operation step S1, the top cap carrying apparatus moving step S2, the image acquisition step S3, the image processing step S4, and the determining step S5. After detection is completed, the cell combining apparatus 200 may continue to perform a subsequent cell combining operation.

Therefore, the detection method of the present disclosure can implement online detection on the anode tab back part and the cathode tab back part, so as to obtain more comprehensive information of quality of the tab back, so that the acquired and processed image can be used for a subsequent process.

According to one or more embodiments, a pair of first detection apparatuses 300A is disposed on opposite sides of the cell combining apparatus in alignment with each other. A pair of second detection apparatuses 300B is disposed on the opposite sides of the cell combining apparatus in alignment with each other. The method includes the following steps: respectively performing, by using the pair of first detection apparatuses, image acquisition on the anode tab back parts of the two bare battery cells disposed in parallel; and respectively performing, by using the pair of second detection apparatuses, image acquisition on the cathode tab back parts of the two bare battery cells disposed in parallel.

Specifically, detection apparatuses are respectively provided for four tabs of the two bare battery cells disposed in parallel. In addition, a horizontal distance and a vertical distance of each image acquisition mechanism relative to the bare battery cell 100 are set to obtain a desired focal length and field of view, so as to acquire a high-quality image from the anode tab back part or the cathode tab back part of the corresponding bare battery cell 100.

In the detection method of the present disclosure, a desired focal length and a field of view of each detection apparatus are used for implementing online detection on the corresponding tab back parts of the two bare battery cells disposed in parallel, so as to obtain high-quality images reflecting the quality of the tab back.

According to one or more embodiments, the first detection apparatus 300A and the second detection apparatus 300B each include an image acquisition mechanism 310 and a light source. The light source includes a coaxial light source 320 disposed coaxially with the image acquisition mechanism 310 and a first strip-shaped light source 330 and a second strip-shaped light source 332 disposed on two sides of the coaxial light source. The method includes the following steps: controlling, by using the control apparatus, to turn on the coaxial light source 320, to enable the image acquisition mechanism 310 to acquire an image having a first exposure; or controlling, by using the control apparatus, to turn on the coaxial light source 320, the first strip-shaped light source 330, and the second strip-shaped light source 332 at the same time, to enable the image acquisition mechanism 310 to acquire an image having a second exposure.

Therefore, optional sufficient supplementary light may be provided for the image acquisition mechanism according to an actual requirement, so as to acquire high-quality images having a desired exposure.

According to one or more embodiments, the cell combining apparatus 200 includes a cell combining flipping mechanism 202 and a second drive mechanism 204. The cell combining operation step S1 includes: driving, by using the second drive mechanism 204, the cell combining flipping mechanism 202, and driving the holding apparatus 500 to gradually flip, so that the body of the bare battery cell 100 is displaced from the lying state to the upright cell combining state.

Specifically, by using the detection system according to the present disclosure, the second drive mechanism 204 drives the cell combining flipping mechanism 202, and the body of the bare battery cell held by the holding apparatus 500 may slowly perform circular motion from the lying state to the upright cell combining state.

Therefore, according to the cell combining operation step, the body of the bare battery cell is smoothly displaced into the upright cell combining state.

According to one or more embodiments, the cell combining apparatus 200 further includes a third drive mechanism 514 for driving the holding apparatus 500. The cell combining operation step S1 includes: driving, by using the third drive mechanism 514, the holding apparatus 500 to gradually clamp the bare battery cell 100 in a flipping operation process, until the body of the bare battery cell is completely carried by the holding apparatus when the body of the bare battery cell is in the upright cell combining state.

Specifically, by using the detection system according to the present disclosure, the holding apparatus 500 is driven through the third drive mechanism 514, so that the clamping force of the holding apparatus 500 is gradually increased during the flipping operation, until the clamping force of the holding apparatus is large enough to bear the entire weight of the bare battery cell 100 when the body of the bare battery cell is in the upright cell combining state.

Therefore, according to the cell combining operation step, the holding apparatus gradually clamps the body of the bare battery cell, so that a possibility of cracking a tab located between the body of the bare battery cell and the top cap can be reduced.

Finally, it should be noted that the foregoing embodiments are merely used for describing the technical solutions of the present disclosure, but are not intended to limit the technical solutions. Although the present disclosure is described in detail with reference to the foregoing embodiments, it should be appreciated by a person skilled in the art that modifications may still be made to the technical solutions described in the foregoing embodiments, or equivalent replacements may be made to part or all of the technical features. However, these modifications or replacements do not cause the essence of the corresponding technical solutions to deviate from the scope of the technical solutions of the embodiments of the present disclosure, and should be covered by the scope of the claims and the specification of the present disclosure. Especially, as long as there is no structural conflict, the various technical features mentioned in the embodiments may be combined in any way. The present disclosure is not limited to the particular embodiments disclosed herein, but includes all technical solutions that fall within the scope of the claims.

What is claimed is:

1. A detection system for detecting a tab back of a bare battery cell in a cell combining apparatus, the detection system comprising:
    a top cap carrying apparatus, the top cap carrying apparatus being configured to be movable at least between a carrying position that supports a top cap of a bare battery cell and a displacement position that exactly abuts against but no longer supports the top cap, the top cap of the bare battery cell being welded together with an anode tab and a cathode tab;
    a cell combining apparatus, the cell combining apparatus being configured to displace bodies of two bare battery cells disposed in parallel from a lying state to an upright cell combining state in a case that the top cap is supported by the top cap carrying apparatus, in the upright cell combining state, the body of the bare battery cell being completely held by a holding apparatus and a tab back facing outward,
    wherein the top cap carrying apparatus is configured to move, under a drive of a first drive mechanism, from the carrying position to the displacement position after the bare battery cell is in the upright cell combining state, to allow the anode tab and the cathode tab to extend to expose an anode tab back part and a cathode tab back part within a desired range;
    a first detection apparatus and a second detection apparatus, both the first detection apparatus and the second detection apparatus comprising an image acquisition mechanism, the first detection apparatus being configured to perform image acquisition on the anode tab back part laterally, and the second detection apparatus being configured to perform image acquisition on the cathode tab back part laterally; and
    a control apparatus, the control apparatus being configured to control the cell combining apparatus to flip the body of the bare battery cell from the lying state to the upright cell combining state, control movement of the top cap carrying apparatus, control image acquisition by the first detection apparatus and the second detection apparatus, and receive and process acquired images, to determine whether defects exist in the anode tab back part and the cathode tab back part, for use in a subsequent process.

2. The detection system according to claim 1, wherein the top cap carrying apparatus comprises:
    a support plate, configured to support the top cap of the bare battery cell; and
    a first drive mechanism disposed on a platform, the first drive mechanism being connected to the support plate, and the first drive mechanism being capable of driving the support plate to move in a direction from the bare battery cell to the platform, so that the anode tab and the cathode tab extend.

3. The detection system according to claim 2, wherein the first drive mechanism further comprises a limiting fixture, the limiting fixture is disposed at an end of the support plate facing the bare battery cell, a surface of a side of the limiting fixture facing the bare battery cell is recessed to form an accommodating groove, and a shape of the accommodating groove matches that of the top cap of the bare battery cell.

4. The detection system according to claim 3, wherein the first drive mechanism further comprises a first drive motor and a limiting assembly, and the limiting assembly comprises:
    a connection plate, connected to the first drive motor; and
    two limiting plates, connected to the connection plate, wherein surfaces of sides of the two limiting plates facing away from the first drive motor are recessed to form limiting grooves, and the limiting grooves are configured to accommodate a part of the support plate to limit movement of the support plate relative to the connection plate.

5. The detection system according to claim 1, wherein a pair of first detection apparatuses is disposed on opposite sides of the cell combining apparatus in alignment with each other, so as to respectively perform image acquisition on the anode tab back parts of the two bare battery cells disposed in parallel; and a pair of second detection apparatuses is disposed on the opposite sides of the cell combining apparatus in alignment with each other, so as to respectively perform image acquisition on the cathode tab back parts of the two bare battery cells disposed in parallel.

6. The detection system according to claim 5, wherein the first detection apparatus and the second detection apparatus further comprise a light source, and the light source comprises a coaxial light source disposed coaxially with the image acquisition mechanism and a first strip-shaped light source and a second strip-shaped light source disposed on two sides of the coaxial light source; and
    the control apparatus is capable of controlling to turn on the coaxial light source, to enable the image acquisition mechanism to acquire an image having a first exposure; or
    the control apparatus is capable of controlling to turn on the coaxial light source, the first strip-shaped light source, and the second strip-shaped light source at the same time, to enable the image acquisition mechanism to acquire an image having a second exposure.

7. The detection system according to claim 6, wherein the first detection apparatus further comprises a mounting member disposed on the platform, the image acquisition mechanism comprises an imaging apparatus and an imaging lens, the imaging apparatus and the imaging lens are disposed on the mounting member, and the imaging lens is disposed between the imaging apparatus and the coaxial light source.

8. The detection system according to claim 1, wherein the cell combining apparatus comprises a cell combining flipping mechanism and a second drive mechanism, and the cell combining flipping mechanism is configured to be driven by the second drive mechanism to gradually flip and displace the body of the bare battery cell from the lying state to the upright cell combining state.

9. The detection system according to claim 8, wherein the second drive mechanism comprises:
  a second drive motor, disposed on the platform;
  a fixed base, disposed on the platform;
  a rotation block, disposed on a side of the fixed base facing away from the second drive motor, wherein an output shaft of the second drive motor passes through the fixed base to be connected to the rotation block, the second drive motor drives the rotation block to rotate about the output shaft of the second drive motor, and the holding apparatus is connected to the rotation block; and
  a rotation bearing, disposed between the rotation block and the fixed base, so as to connect the rotation block to the fixed base rotatably.

10. The detection system according to claim 9, wherein a quantity of the fixed bases is two, two rotation blocks and two rotation bearings are correspondingly provided, the cell combining flipping mechanism further comprises a transmission plate, the transmission plate is connected between the two rotation blocks, and the holding apparatus is disposed on the transmission plate.

11. The detection system according to claim 10, wherein the cell combining apparatus further comprises a third drive mechanism for driving the holding apparatus, the third drive mechanism is configured to drive the holding apparatus to gradually clamp the body of the bare battery cell in a flipping operation process, until the body of the bare battery cell is completely carried by the holding apparatus when the body of the bare battery cell is in the upright cell combining state.

12. The detection system according to claim 11, wherein the holding apparatus comprises a clamping portion disposed on the transmission plate, the clamping portion comprises two clamping members disposed opposite to each other, and a space between the two clamping members is configured for clamping the bare battery cell.

13. The detection system according to claim 12, wherein the clamping member comprises:
  a clamping rod, one end of the clamping rod being connected to the transmission plate; and
  a battery cell clamping block disposed at the other end of the clamping rod, wherein the battery cell clamping block is configured to clamp the bare battery cell and drive the bare battery cell to flip, a surface of the battery cell clamping block facing the bare battery cell is recessed to form a clamping groove, and a shape of the clamping groove matches a shape of the surface of the bare battery cell.

14. The detection system according to claim 13, wherein the third drive mechanism comprises a third drive motor, the third drive motor is disposed on the transmission plate, and the clamping rod is connected to the third drive motor.

15. The detection system according to claim 14, wherein the holding apparatus further comprises a drive connection plate, the drive connection plate is connected to the third drive motor, and the clamping rod is disposed on the drive connection plate; and
  there are two clamping portions, namely, an upper clamping portion and a lower clamping portion, and the upper clamping portion and the lower clamping portion are spaced apart on the drive connection plate.

16. The detection system according to claim 12, wherein a surface of a side of the transmission plate facing the drive connection plate is recessed to form a limiting slot, and the limiting slot extends along an arrangement direction of the two clamping members; and
  a surface of a side of the drive connection plate facing the limiting slot protrudes to form a limiting portion, the limiting portion is disposed in the limiting slot, and the limiting slot is configured to limit movement of the drive connection plate relative to the transmission plate.

17. The detection system according to claim 10, wherein the holding apparatus further comprises a cushion block, and the cushion block is disposed on a side of the transmission plate facing the bare battery cell.

18. A detection method, the detection method detecting a tab back of a bare battery cell in a cell combining operation process of the bare battery cell by using a detection system, the detection system comprising a top cap carrying apparatus, a cell combining apparatus, a first detection apparatus, a second detection apparatus, and a control apparatus, and the top cap carrying apparatus being configured to be movable between a carrying position that supports a top cap of the bare battery cell and a displacement position that exactly abuts against but no longer supports the top cap, wherein
  the detection method comprises:
  a cell combining operation step: flipping, by using the cell combining apparatus, bodies of two bare battery cells disposed in parallel from a lying state to an upright cell combining state in a case that the top cap of the bare battery cell is supported by the top cap carrying apparatus at the carrying position, in the upright cell combining state, the body of the bare battery cell being completely held by a holding apparatus and a tab back facing outward;
  a top cap carrying apparatus moving step: driving, by a first drive mechanism under the control of the control apparatus, the top cap carrying apparatus to move from the carrying position to the displacement position, to allow an anode tab and a cathode tab to extend to expose an anode tab back part and a cathode tab back part within a desired range;
  an image acquisition step: respectively performing image acquisition on the anode tab back part and the cathode tab back part laterally by using the first detection apparatus and the second detection apparatus;
  an image processing step: receiving, by using the control apparatus, images acquired by the first detection apparatus and the second detection apparatus, and performing image processing; and
  a determining step: determining, according to the processed images, whether defects exist in the anode tab back part and the cathode tab back part, for use in a subsequent process;
  the cell combining apparatus comprises a cell combining flipping mechanism and a second drive mechanism, and the cell combining operation step comprises:

driving, by using the second drive mechanism, the cell combining flipping mechanism, and driving the holding apparatus to gradually flip, so that the body of the bare battery cell is displaced from the lying state to the upright cell combining state; and the cell combining apparatus further comprises a third drive mechanism for driving the holding apparatus, and the cell combining operation step comprises:

driving, by using the third drive mechanism, the holding apparatus to gradually clamp the body of the bare battery cell in a flipping operation process, until the body of the bare battery cell is completely carried by the holding apparatus when the body of the bare battery cell is in the upright cell combining state.

19. The detection method according to claim 18, wherein a pair of first detection apparatuses is disposed on opposite sides of the cell combining apparatus in alignment with each other, and a pair of second detection apparatuses is disposed on the opposite sides of the cell combining apparatus in alignment with each other; and the method comprises the following steps:

respectively performing, by using the pair of first detection apparatuses, image acquisition on the anode tab back parts of the two bare battery cells disposed in parallel; and respectively performing, by using the pair of second detection apparatuses, image acquisition on the cathode tab back parts of the two bare battery cells disposed in parallel.

20. The detection method according to claim 19, wherein both the first detection apparatus and the second detection apparatus comprise an image acquisition mechanism and a light source, and the light source comprises a coaxial light source disposed coaxially with the image acquisition mechanism and a first strip-shaped light source and a second strip-shaped light source disposed on two sides of the coaxial light source; and the method comprises the following steps:

controlling, by using the control apparatus, to turn on the coaxial light source, to enable the image acquisition mechanism to acquire an image having a first exposure; or controlling, by using the control apparatus, to turn on the coaxial light source, the first strip-shaped light source, and the second strip-shaped light source at the same time, to enable the image acquisition mechanism to acquire an image having a second exposure.

\* \* \* \* \*